(12) United States Patent
Mikkulainen et al.

(10) Patent No.: US 9,310,075 B2
(45) Date of Patent: Apr. 12, 2016

(54) METHOD OF REDUCING FLUE GAS EMISSIONS AND A BOILER

(75) Inventors: Pasi Mikkulainen, Kotka (FI); Lauri Pakarinen, Kotka (FI)

(73) Assignee: Andritz Oy, Helsinki (FI)

(*) Notice: Subject to any disclaimer, the term of this patent is extended or adjusted under 35 U.S.C. 154(b) by 534 days.

(21) Appl. No.: 13/264,516

(22) PCT Filed: Apr. 14, 2010

(86) PCT No.: PCT/FI2010/050298
§ 371 (c)(1),
(2), (4) Date: Nov. 16, 2011

(87) PCT Pub. No.: WO2010/119177
PCT Pub. Date: Oct. 21, 2010

(65) Prior Publication Data
US 2012/0186541 A1    Jul. 26, 2012

(30) Foreign Application Priority Data
Apr. 15, 2009   (FI) .................................. 20090141

(51) Int. Cl.
*B09B 3/00* (2006.01)
*F23J 15/00* (2006.01)
(Continued)

(52) U.S. Cl.
CPC ............... *F23J 15/003* (2013.01); *B01D 53/56* (2013.01); *F22B 21/341* (2013.01); *F22B 21/40* (2013.01); *B01D 2251/2062* (2013.01); *B01D 2251/2067* (2013.01); *F23G 2209/101* (2013.01); *F23J 2215/101* (2013.01)

(58) Field of Classification Search
CPC .... B01D 53/565; B01D 53/56; F22B 21/341; F22B 21/40; F23G 2209/101; F23J 2215/101
USPC ........................................... 122/4 D; 110/214
See application file for complete search history.

(56) References Cited

U.S. PATENT DOCUMENTS 5,299,534 A * 4/1994 Janka ............................ 122/477
5,342,592 A * 8/1994 Peter-Hoblyn et al. ....... 423/235
(Continued)

FOREIGN PATENT DOCUMENTS

GB       2375160 A  * 11/2002  ............... F23J 15/00
WO       91/00134         1/1991
(Continued)

*Primary Examiner* — Steven B McAllister
*Assistant Examiner* — Steven Anderson, II
(74) *Attorney, Agent, or Firm* — Nixon & Vanderhye P.C.

(57) ABSTRACT

The present invention relates to a method and a boiler for decreasing the amount of nitrogen oxides in flue gases of a boiler, which flue gases are generated in the combustion of fuels and air. The boiler has a water circulation system comprising superheaters (8) and a furnace (1) for combustion of fuel and for generating flue gases that contain nitrogen oxides, which flue gases mainly flow upwards in the furnace and further to the superheater zone and via other heat recovery surfaces of the boiler out of the boiler, and a nitrogen oxides reducing agent is introduced into the flue gases. It is essential that the nitrogen oxides reducing agent is introduced into the flue gases prior to the superheater zone, before which the temperature of the flue gases is decreased by means of at least one heat exchanger (15) that is located in the flue gas flow upstream of the introduction of the reducing agent, for obtaining a suitable temperature window in the flue gas flow in order to reduce nitrogen oxides.

18 Claims, 2 Drawing Sheets

(51) Int. Cl.
   *B01D 53/56* (2006.01)
   *F22B 21/34* (2006.01)
   *F22B 21/40* (2006.01)

(56) References Cited

U.S. PATENT DOCUMENTS

| | | | | |
|---|---|---|---|---|
| 5,343,820 | A | * | 9/1994 | Marion .................. 110/264 |
| 5,407,649 | A | * | 4/1995 | Andersson et al. ............ 431/7 |
| 5,911,956 | A | * | 6/1999 | Viel Lamare et al. ........ 422/177 |
| 6,019,068 | A | * | 2/2000 | Tsuo et al. ................. 122/4 D |
| 6,178,924 | B1 | * | 1/2001 | Hakulinen et al. ........... 122/7 R |
| 6,280,695 | B1 | * | 8/2001 | Lissianski et al. ......... 423/239.1 |
| 2006/0065291 | A1 | * | 3/2006 | Jones et al. .................. 134/22.1 |
| 2006/0249098 | A1 | * | 11/2006 | Raukola et al. ............... 122/7 R |
| 2008/0110381 | A1 | * | 5/2008 | Swanson et al. ............. 110/345 |
| 2008/0175774 | A1 | | 7/2008 | Morrison et al. |
| 2009/0031929 | A1 | * | 2/2009 | Boardman et al. ............ 110/203 |
| 2010/0203461 | A1 | * | 8/2010 | Maly et al. ........................ 431/9 |

FOREIGN PATENT DOCUMENTS

| | | |
|---|---|---|
| WO | 2004/105928 | 12/2004 |
| WO | WO 2004105928 A2 * | 12/2004 |
| WO | 2005/118113 | 12/2005 |

\* cited by examiner

METHOD OF REDUCING FLUE GAS EMISSIONS AND A BOILER

CROSS RELATED APPLICATIONS

This application is the U.S. national phase of International Application No. PCT/FI2010/050298 filed 14 Apr. 2010 which designated the U.S. and claims priority to Finnish Patent Application No. 20090141 filed 15 Apr. 2009, the entirety of these applications are incorporated by reference.

BACKGROUND OF INVENTION

The present invention relates to a method of decreasing an amount of nitrogen oxides from flue gases of a boiler, which nitrogen oxides are generated in the combustion of fuels and air or other oxygen-containing gas. The invention also relates to a steam-generating boiler.

Flue gases of steam-generating boilers, such as a recovery boiler of a chemical pulp mill, are led from the furnace into contact with various heat exchangers, superheaters, boiler bank and water preheaters of the boiler, whereby the heat contained in the gases is recovered in the water, steam or mixture thereof flowing in the heat exchangers. The boiler bank refers to a heat exchanger comprising heat exchange elements, inside which the boiler water to be heated flows. The economizer (preheater) of the boiler refers to a heat exchanger comprising heat exchange elements, inside which the boiler feed water to be heated flows. Free space for flue gas flow remains in the boiler bank and the economizer between the heat exchanger elements. As the flue gas passes by the heat exchanger elements, heat is transferred into the feed water or boiler water flowing inside the elements. From the economizer the flue gases of the boiler are led in a way known per se via a flue gas discharge conduit to gas purification following the boiler, such as an electrostatic precipitator.

FIG. 1 illustrates the construction of a chemical recovery boiler having a furnace 1 defined by water tube walls: front wall 2, side walls 3 and rear wall 4, as well as a bottom 5 formed of water tubes. Combustion air is fed into the furnace from several different levels as primary, secondary and tertiary air. There may be also other air levels. Waste liquid, such as black liquor, is led via nozzles 6 located between the secondary and tertiary air zones. During combustion, the waste liquid forms a smelt bed on the bottom 5 of the furnace, wherefrom the smelt is discharged via a smelt spout 7 adapted in the lower part of the furnace.

Above the furnace, heat recovery surfaces, i.e. superheaters 8 are provided, and the heat exchangers, a boiler bank 9 and economizers 10, follow the superheaters located above the furnace and are positioned on the side of the rear wall 4. The heat generated in the furnace is recovered in said boiler bank and economizers. On the boiler banks 9, water in saturated temperature is boiled partly into steam and in feed water preheaters 10 the water is heated by means of flue gas prior to leading the water into the steam-generating part 9 and the superheating parts 8 of the boiler. In the superheaters, the saturated steam is heated to generate steam at a higher temperature. The so-called bullnose is marked with reference numeral 14.

The water/steam circulation of the boiler is arranged via natural circulation, whereby the water/steam mixture formed in the water tubes of the walls and bottom of the furnace rises upwards via collection tubes into a steam drum 11 that is located cross-wise in relation to the boiler, i.e. parallel to the front wall 2. Hot water flows from the steam drum via downcomers 12 into a manifold 13 on the bottom, wherefrom the water is distributed into the bottom water tubes and further into the water tube walls.

A waste liquor recovery boiler is conventionally formed of the following main parts, which are illustrated schematically in FIG. 1:

A lower part 16 of the furnace, where combustion of waste liquor mainly takes place.

A middle part 17 of the furnace, where final combustion of gaseous combustible substances mainly takes place.

An upper part 18 of the furnace

A superheater zone 8, wherein the saturated steam exiting the steam drum 11 is transformed into (superheated) steam having a higher temperature. In the superheater zone or upstream thereof there is often provided a so-called screen tube system 15 that usually boils water.

A boiler bank 9, i.e. water vaporizer, wherein water at a saturated temperature is partly boiled into steam.

Feed water preheaters, i.e. so-called economizers 10, wherein the feed water flowing in the heat transfer elements is preheated by means of flue gases prior to leading the water into the drum 11 and the steam-generating parts 9 and superheating parts 8 of the boiler.

A drum (or steam drum) 11 with water in the lower part and saturated steam in the upper part. Some boilers have two drums: a steam drum (upper drum) and a water drum (lower drum), wherebetween a heat transfer element, so-called boiler tubes for boiling the water are provided.

A bullnose, where the boiler narrows and which is a common boundary area between the furnace and the heat recovery surfaces, is located at the upper part of the furnace on the rear wall of the boiler. The bullnose is formed of a recess in the rear wall of the boiler, which recess is directed towards the front wall of the boiler. Thus, the bullnose comprises a lower wall part that is typically directed diagonally from the rear wall towards the front wall of the boiler, an upper wall part that is directed from the front wall of the boiler diagonally towards the rear wall, and a bullnose arch or tip that combines these. The purpose of the bullnose area is to protect the superheater part against direct heat radiation from the furnace and to assist the upwards flowing flue gas in turning around the corner towards the flue gas discharge conduit of the boiler so that the gases flow evenly by the heat recovery surfaces. The so-called depth of the bullnose, which plays an important part in guiding the flue gas flow into the upper part of the furnace, is e.g. in single drum boilers typically 40-50% of the total depth of the furnace, which means the horizontal length of the side wall of the furnace.

Many recovery boilers are additionally provided with screen tubes upstream of the superheaters in the gas flow direction typically horizontally at the deepest part of the bullnose. Typically, a saturated mixture of water and steam flows in the screen tubes, which is connected to the water circulation of the boiler. The purpose of the screen is to cool the flue gases to some extent before they enter the superheater zone, to prevent heat radiation from the furnace to the superheater tubes and to retain a part of so-called carry-over particles escaping from the furnace.

An abundant amount of flue gases containing various impurities, such as nitrogen oxides, are generated in the combustion of various fuels, such as black liquor. During combustion, nitrogen oxide is generated from a part of nitrogen entrained in air and fuel, while the rest of the nitrogen exits as molecular nitrogen ($N_2$) and as small amounts of hazardous compounds such as dinitrogen oxide ($N_2O$), ammonia ($NH_3$)

and hydrogen cyanide (HCN). Nitrogen oxides are formed via several various routes, depending on the conditions and fuels.

The purpose of methods for removing nitrogen oxides is to minimize polluting nitrogen oxide emissions and thus to maximize the portion of harmless molecular nitrogen $N_2$, simultaneously keeping the emissions of all other hazardous compounds at a low level. Typical nitrogen oxide removal methods include fuel staging, air staging and selective non-catalytic reduction, SNCR.

Selective non-catalytic reduction is reduction of nitrogen oxide generated in combustion by addition of a reagent, such as ammonia. The efficiency of the method is influenced by operation conditions, the composition of the fuel and the reagent present. Thus, this technique has provided known embodiments, comprising a fuel-lean process using ammonia, [U.S. Pat. No. 3,900,554], a fuel-rich process using ammonia [U.S. Pat. No. 4,325,924], and a fuel-rich process using urea [U.S. Pat. No. 4,335,084].

SNCR variations comprise addition of a reducing agent via various flows, e.g. with reburning fuel, with air or alone. The operation of each variation is limited to precisely determined conditions. In the absence of carbon monoxide (CO), fuel-lean SNCR operates in ranges 1100-1400 K (827-1127° C.), while fuel-rich SNCR operates at higher temperatures. However, carbon monoxide is present in almost all processes utilizing the SNCR-method, and the detrimental result thereof is shifting and narrowing of temperature windows. Optimal conditions for SNCR are hard to create in several combustion apparatuses.

U.S. Pat. No. 5,820,838 describes a circulating fluidized bed boiler, where heat transfer pipes, such as omega-pipes, are installed in the flue gas flow. In the solution, means for injecting an agent that reacts with nitrogen oxides (e.g. ammonia or urea) are integrated in the omega-pipes. The aim is to obtain adequate cooling of the reducing agent to a low temperature, e.g. 100-600° C., while injecting so that the reducing agent does not decompose. However, in this patent no attention has been paid to creating a suitable temperature window between nitrogen oxide and the reducing agent.

Decreasing of NOx-contents in recovery boilers has already been applied by methods based on staging or SNCR-technique using i) "quaternary air" in the upper part of the recovery boiler at a high level, in one embodiment of which ammonia is added entrained in said air (WO 97/21869), ii) "vertical air staging" [FI 101420 B], where air jets are fed into the furnace of the recovery boiler by means of nozzles located at several vertical elevations, iii) "Mitsubishi Advanced Combustion Technology" (MACT) [Arakawa Y., Ichinose T., Okamoto A., Baba Y, Sakai T., in Proc. of the Int. Chemical Recovery Conf., Whistler, British Columbia, Jun. 11-14, 257-260, 2001], where a reducing agent (urea) can be added after air staging, and iv) black liquor staging [FI Patent 103905], where black liquor is fed from at least two levels into a furnace having vertical air staging according to (ii). By means of these techniques, a NOx-reduction of 30-50% has been reached, but in practice they require adjustments that are not optimal for a recovery boiler. Often these techniques require oversized furnaces for keeping the temperature after the furnace adequately low and/or more expensive material solutions for preventing corrosion. In practice staged combustion or SNCR-technique in recovery boilers requires temperatures even as low as 850-1000° C., which are reached only in such recovery boilers that are bigger and thus more expensive than conventional boilers.

SUMMARY OF INVENTION

A method has been conceived for controlling the emissions of detrimental nitrogen compounds, especially nitrogen oxides, entering from combustion processes, in a way that is more efficient and more economical than the methods described in the above. Especially a purpose of the present invention is to provide a method and an apparatus for arranging a suitable temperature window for a method of removing nitrogen oxides based on SNCR-technique. The present invention can be applied especially in a chemical recovery boiler, but also in other steam-generating boilers, where creating a temperature window required by the SNCR-technique is needed.

A method has been conceived of decreasing the amount of nitrogen oxides from flue gases of a boiler, which nitrogen oxides are generated in combustion of fuels and air, said boiler having a water circulation system comprising super-heaters and a furnace for combusting fuel and for generating flue gases containing nitrogen oxides, which flue gases flow mainly upwards in the furnace and further to a superheater zone and via other heat recovery surfaces of the boiler out of the boiler, and an agent for reducing nitrogen oxides is introduced in said flue gases. The nitrogen oxides reducing agent is introduced into the flue gases prior to the superheater zone, before which the temperature of the flue gases is decreased by means of at least one heat exchanger that is located in the flue gas flow upstream of the introduction of the reducing agent, for obtaining a suitable temperature window in the flue gas flow in order to reduce nitrogen oxides.

Also, a steam-generating boiler has been conceived having a water circulation system comprising heat recovery surfaces, such as superheaters, and a furnace for combusting fuel and for generating flue gases, which flue gases flow mainly upwards in the furnace and further to a superheater zone and via other heat recovery surfaces out of the boiler, and feeding means for introducing an agent for reducing nitrogen oxides in the flue gases. One or more heat exchangers are located in the flue gas flow in the furnace for decreasing the temperature of the flue gases and for creating a suitable temperature window in the flue gas flow for reducing nitrogen oxides, and that the feeding means for the reducing agent are located in the flue gas flow direction after one or more heat exchangers and prior to the superheater zone.

In this connection, a heat exchanger refers to an apparatus, wherein heat is recovered from flue gas indirectly into a medium. Typically the apparatus comprises pipes, inside which the medium receiving heat from the flue gases flows.

Heat may be recovered from flue gases in said heat exchanger or heat surface into the water circulation system of the boiler for superheating steam and/or for boiling boiler water and/or for preheating feed water. Heat can be recovered also for heating combustion air of the boiler and/or for heating another medium by means of the heat exchanger. Heat is recovered from flue gases by a heat exchanger mounted in the upper part of the furnace, the number of said heat exchangers being at least one, and thus the temperature of the flue gas is decreased to be suitable for decreasing the nitrogen oxide amount by means of a reducing agent, such as ammonia.

The heat exchanger or heat exchangers are located in such a point that an adequate volume is formed for feeding a reagent and for reacting at a proper temperature prior to the superheater zone that typically is located above the bullnose.

As earlier described, a boiler, especially a chemical recovery boiler, can be provided with screen tubes upstream of the superheaters in the gas flow direction, typically horizontally at the deepest point of the bullnose. In the arrangement according to the present invention said heat exchanger can be a screen tube system located in accordance with one preferred embodiment in the vertical direction of the furnace at such an elevation that a space favorable to injecting a SNCR-reagent is formed screen tube system in the flue gas flow upstream of the superheaters located above the bullnose.

As mentioned earlier, the bullnose of the boiler forms a recess in the rear wall of the boiler, which recess is directed towards the front wall of the boiler. Thus, the bullnose comprises a lower wall part that is typically directed diagonally from the rear wall towards the front wall of the boiler, an upper wall part that is directed from the front wall of the boiler diagonally towards the rear wall, and a bullnose arch or tip that can also be a mainly upright wall part (the vertical part of the rear wall of the boiler). According to an embodiment of the invention, said at least one heat exchanger, such as screen, is located in the elevational direction of the boiler below the bullnose. Depending on the shape of the bullnose, at least one heat exchanger, such as a screen, can according to an embodiment of the invention also be located in the area of the bullnose. In that case the tip of the bullnose is preferably formed of a vertical wall part combining the inclined lower and upper walls, whereby the bullnose area in the vertical direction is adequately long for locating the heat exchanger or heat exchangers.

In the solution according to the invention, the heat exchanger or heat exchangers are to be located at such a distance from the superheaters thereabove that between the heat exchanger and the superheater an agent for reducing nitrogen oxides can be fed in an advantageous way so that said reducing agent has enough time to react with the nitrogen oxides for removing them from the flue gas to the largest possible extent prior to the superheater zone. The required distance is influenced by retention time, the efficiency of mixing of the reducing agent with the flue gas and the temperature of the flue gas.

An advantage of the invention is that the agent reacting with NOx (e.g. ammonia or urea) can be injected in the proper temperature window in large volume, whereby an adequate retention time is obtained. The agent can be introduced e.g. entrained in air jets above a heat exchanger, such as screen, by evaporating the ammonia into the air, whereby efficient mixing is obtained simultaneously. An additional advantage worth mentioning is that the location of the screen in accordance with the invention decreases the escape of liquor particles, i.e. so-called carry over up onto the superheater surfaces.

In the solution of the invention preferably at least one heat exchanger that is located in the flue gas flow direction upstream of the injection of a SNCR-reagent acts as a superheater. In other words, at least part of the screen transfers heat from the flue gas into the superheated steam. Thus, the size of the boiler or the volume of the superheating surface does not grow, because the screen tubes form a part of the superheating surface capacity required in the boiler.

The heat exchanger or heat exchangers located upstream of the injection of the SNCR-reagent are dimensioned such that the flue gas temperature decreased adequately for obtaining the desired temperature window. So, in accordance with the invention, a number of heat exchangers with adequate capacity for decreasing the flue gas temperature for a suitable temperature window is located in the flue gas flow upstream of the reaction of the reagent and the nitrogen oxides in the flue gas.

The solution according to the invention allows lowering the height of the superheaters that typically are located above the bullnose and thus also lowering the total height of the boiler.

Obtaining the desired temperature window in the furnace of a boiler where heat is transferred mainly into the walls of the furnace only, would make the furnace of the boiler, and thus whole boiler and the boiler plant very high.

The invention allows utilizing the SNCR-technique especially in a chemical recovery boiler or other steam boiler where mixing of injected ammonia or urea is difficult, at a required temperature.

By installing in accordance with the invention at least one heat exchanger in the furnace upstream of the injection of an agent (e.g. ammonia) reacting with NOx, a lower temperature is obtained, which allows introducing the reducing agent in a proper temperature window in the furnace, whereby nitrogen oxides form nitrogen and water. This has been problematic especially in a chemical recovery boiler of a chemical pulp mill where the temperatures in the furnace are typically too high for applying the SNCR-method. Additionally, passing of a reducing agent, such as ammonia or urea, on the superheater surfaces is undesired, because feeding of substances at a later stage would be disadvantageous due to superheater corrosion. In bubbling fluidized bed (BFB) boilers the temperatures are typically lower than in a recovery boiler, but the present invention can be applied in connection with them as well, if needed.

The present invention allows e.g. feeding the injected reducing agent, such as urea and/or ammonia together with a medium, e.g. air or circulated flue gas, effectively in the furnace upstream of the superheaters, which thus will be better protected against possible corrosive effect of the SNCR-agent. Feeding of the reducing agent together with combustion air of the boiler is advantageous, because then there is no need to provide the boiler with additional openings for feeding said agent. The carrier gas for the reducing agent can originate from the boiler's combustion air system or a separate dedicated gas source. The flue gas used as carrier gas can originate from a boiler wherein the invention is applied or from another boiler at the mill.

The feeding can be effected with ammonia gas also pressurized together with steam. Ammonia can also be sucked from a container by means of a steam ejector and injected into the boiler together with steam. The ammonia can also be liquefied, mixed into water and sprayed into the boiler.

In the feed of the reducing agent, the medium can also be e.g. a combination of the above mentioned media, e.g. air and flue gas.

SUMMARY OF DRAWINGS

The present invention is described in more detail in the following with reference to the appended figures, of which.

The present invention is described in more detail in the following with reference to the appended figures, of which

DETAILED DESCRIPTION

Figure 1:
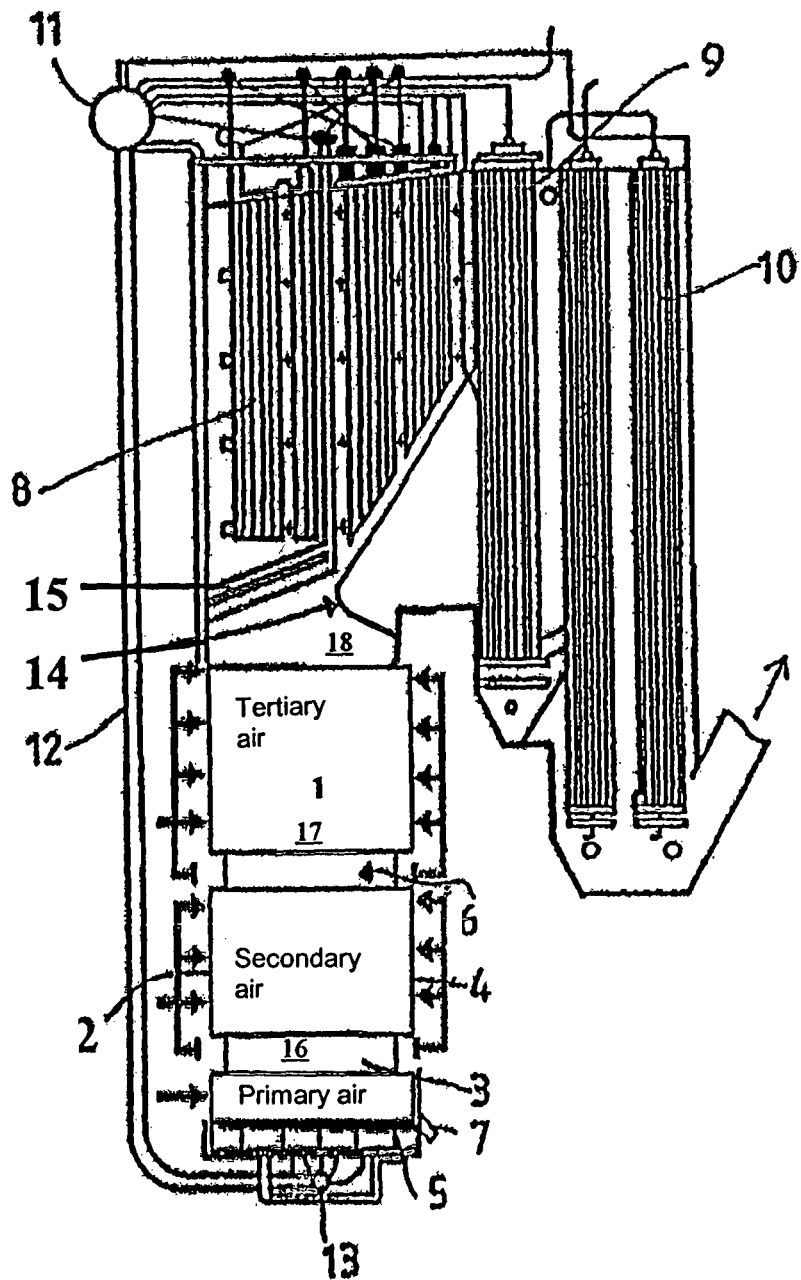
FIG. 1 illustrates schematically a chemical recovery boiler know per se.
Figure 2C:
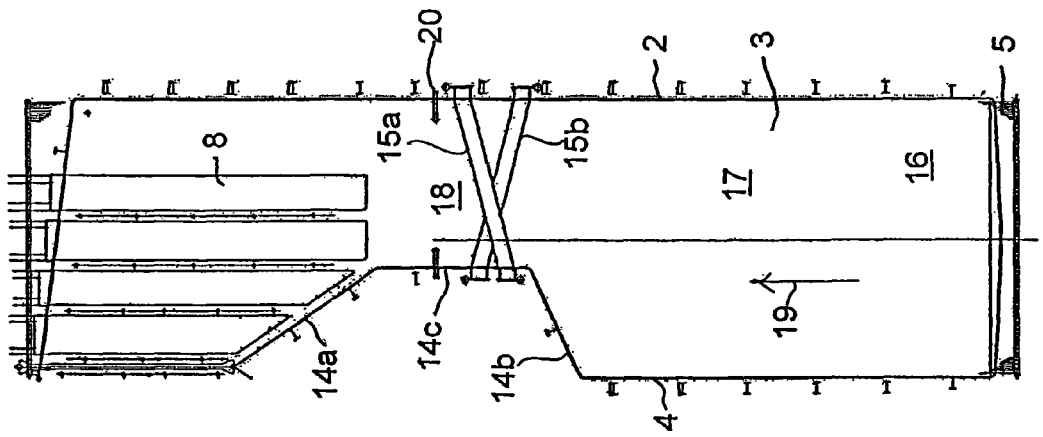
FIGS. 2a, 2b and 2c illustrate schematically some embodiments of the invention.
Figure 2B:
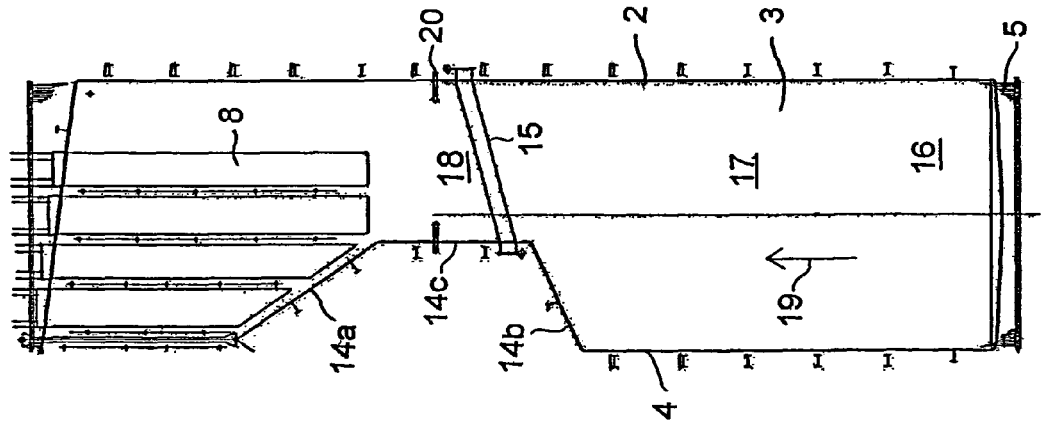
Figure 2A:
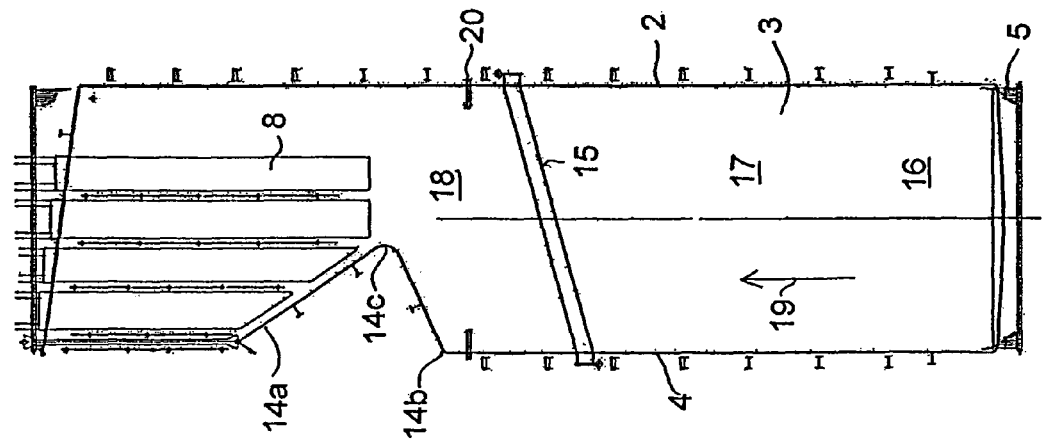

FIGS. 2a-2c use the same reference numerals as FIG. 1 where applicable.

FIGS. 2a-2c illustrate the construction of a recovery boiler having a furnace defined by water tube walls: a front wall 2, side walls 3 and a rear wall 4, as well as a bottom 5 formed of water tubes. Superheaters 8 of the boiler are located above the furnace.

A lower part 16 of the furnace, where the combustion of waste liquor mainly takes place.

A middle part 17 of the furnace, where the final combustion of gaseous combustible substances mainly takes place.

An upper part 18 of the furnace

A superheater area 8, wherein the saturated steam exiting the steam drum is heated into (superheated) steam having a higher temperature. A so-called screen tube system 15 is provided in the flue gas flow direction upstream of the superheater zone above the bullnose.

Flue gas generated in the furnace flows upwards into the upper part of the furnace and further to other heat recovery parts of the boiler, such as superheaters 8. The main flow direction of the flue gas is marked with an arrow 19.

A bullnose 14, where the boiler narrows and which is a common boundary area between the furnace and the heat recovery surfaces, is located at the upper part 18 of the furnace on the rear 4 wall of the boiler. The bullnose is formed of a recess in the rear wall of the boiler, which recess is directed towards the front wall 2 of the boiler. Thus, the bullnose comprises a lower wall part 14b that is typically directed diagonally from the rear wall 4 towards the front wall 2 of the boiler, an upper wall part 14a that is directed from the front wall 2 of the boiler diagonally towards the rear wall 4, and a bullnose arch or tip 14c that combines these.

FIG. 2a illustrates a heat exchanger according to the invention, in this case a screen 15, located in the upwards flowing flue gas flow 19 below the bullnose 14 of the boiler. Feeding means 20 for an agent reducing nitrogen oxides are located between the screen and the lower edge 8a of the superheater 8. The screen 15 extends from the front wall to the rear wall, whereby it covers the horizontal cross-sectional surface of the furnace, whereby the screen gets well into contact with the upwards flowing flue gas, and thus the temperature of the flue gas can be decreased to be advantageous for the reduction of nitrogen oxides. The screen acts in this embodiment advantageously at least partly as a superheating surface. As the screen acts partly as superheating surface, part of the screen acts as evaporator for water. A screen acting as a heat exchanger is dimensioned so that the temperature of flue gas decreases adequately in order to achieve a desired temperature window.

In the embodiment of FIG. 2a, where the heat exchanger cooling the flue gas is located below the bullnose, the reducing agent is introduced e.g. with tertiary air.

The tip of the bullnose can also be a mainly vertical wall part 14c (FIGS. 2b and 2c). In this case, according to an embodiment of the invention, the heat exchanger or heat exchanging surface, such as a screen, is located in the area of the bullnose tip (FIG. 2b). In that case the tip of the bullnose is preferably formed of a vertical wall part combining the inclined lower and upper walls, whereby the bullnose area in the vertical direction is adequately long for locating the heat exchanger 15 and the means 20 for feeding the reducing agent. The distance of the heat exchanger from the superheaters 8 has to be adequate in order to provide the nitrogen oxides and the reducing agent enough time to react prior to the superheater zone.

In the embodiment of FIG. 2c the tip of the bullnose is also a mainly upright wall part 14c. The area of the bullnose tip is provided with screens 15a and 15b located crosswise and staggered, which is advantageous in view of space utilization. In this case, means 20 for feeding a reducing agent for nitrogen oxides are provided also above the screen.

In the embodiments of FIGS. 2b and 2c the reducing agent, such as ammonia is preferably introduced entrained in air or by circulating flue gas or in another way described in the above.

The solution according to the present invention allows arranging a suitable temperature window in a steam-generating boiler, especially a chemical recovery boiler for a method of removing nitrogen oxides based on SNCR-technique.

Although only some preferred embodiments of the method according to the invention have been described in the above, the invention covers all such modifications and variations that are included in the scope defined in the claims.

The invention claimed is:

1. A method of decreasing an amount of nitrogen oxides generated in the combustion of fuels and air from flue gases of a boiler, said boiler having walls defining a gas path with a furnace zone and a superheater zone, a nose in the walls between the furnace zone and the superheater zone that is aligned with a narrowest region of the boiler, a water circulation system comprising superheaters in the superheater zone, and a furnace in the furnace zone for combusting fuel and for generating flue gases containing nitrogen oxides, the method comprising:
   directing the flue gases mainly upwards through the furnace zone, through the superheater zone and out of the boiler,
   introducing an agent at the nose for reducing nitrogen oxides into said flue gases while the flue gases are in the furnace zone,
   while the flue gases are in the furnace zone, and upstream of the introduction of the agent, decreasing the temperature of the flue gases by passing the flue gases through at least one heat exchanger, wherein the decrease of the temperature causes the flue gases to be in a suitable temperature range at the introduction of the agent in order to reduce nitrogen oxides, and the at least one heat exchanger covers a horizontal cross section of the furnace zone at the nose, providing a volume in the boiler defined by the walls of the boiler that is downstream of the heat exchanger and upstream of the superheater zone to introduce and react the agent prior to the flue gas reaching the superheater zone.

2. A method according to claim 1, wherein, in the heat exchanger, heat is recovered from the flue gases for superheating steam.

3. A method according to claim 1, wherein, in the heat exchanger, heat is recovered from the flue gases and used to evaporate boiler water.

4. A method according to claim 1, wherein, in the heat exchanger, heat is recovered from the flue gases and used to preheat boiler feed water.

5. A method according to claim 1, wherein, in the heat exchanger, heat is recovered from the flue gases and used to heat combustion air for the boiler.

6. A method according to claim 1, wherein the reducing agent is conveyed by a medium into the flue gas flow.

7. A method according to claim 6, wherein the reducing agent is conveyed by air to the flue gas flow.

8. A method according to claim 6, wherein the reducing agent is conveyed by flue gas to the flue gas flow.

9. A method according to claim 1, wherein the reducing agent for reducing nitrogen oxides is ammonia, urea or a precursor producing ammonia.

10. A method according to claim 1, further comprising combusting black liquor in the furnace.

11. A steam-generating boiler having a water circulation system comprising:
    walls defining a flue gas passage, wherein the flue gas passage includes a furnace zone and a superheater zone;
    a nose in at least one of the walls between the furnace zone and the superheater zone, the nose is aligned with a narrowest region of the flue gas passage;
    heat recovery surfaces in the superheater zone and arranged within the flue gas passage; a furnace within which fuel is combusted and flue gases are generated, wherein the furnace is within the furnace zone;

the walls adjacent the furnace zone extend upward and the flue gas passage extends upward through the furnace zone;

a feeder extending through the walls at the nose and configured to introduce a reducing agent into the flue gases in the furnace zone and upstream of the superheater zone, wherein the reducing agent reduces nitrogen oxides in the flue gases, and at least one heat exchanger located at the nose and in the flue gas passage upstream of the feeder, wherein the at least one heat exchanger substantially covers an entire horizontal cross-sectional area of the furnace zone, forming a volume in the boiler defined by the walls of the boiler that is downstream of the heat exchanger and upstream of the superheater zone to introduce and react the reducing agent prior to the flue gas reaching the superheater zone, the at least one heat exchanger is configured to decrease the temperature of the flue gas to a certain temperature range determined based on a desired flue gas temperature for the introduction of the reducing agent.

12. A boiler according to claim 11, wherein said at least one heat exchanger is connected to the boiler water circulation system and steam flowing in the system is superheated in the heat exchanger which receives heat energy from the flue gases.

13. A boiler according to claim 11, wherein the feeder for the reducing agent is connected to the boiler combustion air system or flue gas discharge system such that combustion air or circulated flue gas is a carrier gas for the introduction of the reducing agent.

14. A boiler according to claim 11, wherein the feeder for the reducing agent is connected to a gas source which supplies a carrier gas for the introduction of the reducing agent.

15. A boiler according to claim 11, wherein the feeder for the reducing agent is connected to the flue gas discharge system of another boiler for using circulated flue gas as carrier gas in the introduction of the reducing agent.

16. A boiler according to claim 11, wherein the boiler is a chemical recovery boiler of a chemical pulp mill.

17. A method to reduce nitrogen oxides exhausted from a boiler including walls defining a gas path including a furnace zone and a superheater zone downstream of the furnace zone wherein a nose in at least one of the walls separates the furnace zone and the superheater zone, the nose is aligned with a narrowest region of the boiler, the method comprising:

combusting fuel and air in the furnace zone and generating flue gases from the combustion;

as the flue gases flow upward through the furnace zone, cooling the flue gases to a suitable temperature range by passing the flue gases through a heat exchanger located at the nose, forming a volume in the boiler defined by the walls of the boiler that is downstream of the heat exchanger and upstream of the superheater zone to introduce and react an agent prior to the flue gas reaching the superheater zone, and covering a horizontal cross section of the furnace zone;

feeding the agent at the nose and downstream of the heat exchanger to reduce nitrogen oxides into the cooled flue gases while the flue gases are in the furnace zone, whereby a reaction between the agent and the cooled flue gases forms flue gases with reduced nitrogen oxides;

flowing the flue gases with reduced nitrogen oxides through the gas path from the furnace zone and into the superheater zone;

flowing the flue gases with reduced nitrogen oxides through a superheater arranged in the superheater zone of the gas path, and transferring heat from the flue gases with reduced nitrogen oxides to steam flowing through the superheater.

18. A steam-generating boiler having a water circulation system comprising:

walls defining a flue gas passage, wherein the flue gas passage includes a furnace zone and a superheater zone;

a nose in at least one of the walls between the furnace zone and the superheater zone, the nose is aligned with a narrowest region of the flue gas passage;

heat recovery surfaces in the superheater zone and arranged within the flue gas passage;

a furnace within which fuel is combusted and flue gases are generated, wherein the furnace is within the furnace zone;

the walls adjacent the furnace zone extend upward and the flue gas passage extends upward through the furnace zone;

a feeder extending through the walls at the nose and configured to introduce a reducing agent into the flue gases in the furnace zone, the feeder is located upstream of the superheater zone, wherein the reducing agent reduces nitrogen oxides in the flue gases;

at least one heat exchanger at the nose and upstream of the feeder, a distance between the heat exchanger and the superheater zone that is confined by the walls of the boiler defines a volume within the furnace zone, in which the reducing agent reacts with the flue gas before the flue gas reaches the superheater zone, and wherein the at least one heat exchanger substantially covers an entire horizontal cross-sectional area of the furnace zone, and the at least one heat exchanger is configured to decrease the temperature of the flue gas to a certain temperature range selected for introduction of the reducing agent from the feeder.

* * * * *